United States Patent
Dinur (10) Patent No.: US 7,310,381 B2
(45) Date of Patent: Dec. 18, 2007

(54) POWER AMPLIFIER PRE-DISTORTION DEVICE AND METHOD FOR ORTHOGONAL FREQUENCY DIVISION MULTIPLEXING

(75) Inventor: Nati Dinur, Omer (IL)

(73) Assignee: Intel Corporation, Santa Clara, CA (US)

( * ) Notice: Subject to any disclaimer, the term of this patent is extended or adjusted under 35 U.S.C. 154(b) by 778 days.

(21) Appl. No.: 10/461,362

(22) Filed: Jun. 16, 2003

(65) Prior Publication Data

US 2004/0252773 A1    Dec. 16, 2004

(51) Int. Cl.
*H04K 1/02*    (2006.01)
(52) U.S. Cl. .................................................... 375/297
(58) Field of Classification Search ................ 375/259, 375/295, 296, 297, 298, 260, 261
See application file for complete search history.

(56) References Cited

U.S. PATENT DOCUMENTS

| | | | | |
|---|---|---|---|---|
| 5,452,473 A * | 9/1995 | Weiland et al. | ............... | 455/88 |
| 5,548,616 A * | 8/1996 | Mucke et al. | ............... | 375/295 |
| 6,122,491 A * | 9/2000 | Francisco | ................ | 455/127.2 |
| 6,169,449 B1 * | 1/2001 | Hasegawa | ..................... | 330/51 |
| 6,304,139 B1 * | 10/2001 | Kanno | ........................ | 330/133 |
| 6,434,373 B2 * | 8/2002 | Ichihara | .................... | 455/127.5 |
| 6,653,909 B2 * | 11/2003 | Nielsen | ....................... | 332/151 |
| 6,721,368 B1 * | 4/2004 | Younis et al. | ................ | 375/295 |
| 6,731,910 B2 * | 5/2004 | Taira et al. | .................... | 455/69 |
| 6,876,697 B2 * | 4/2005 | Peters et al. | ................. | 375/222 |
| 6,882,217 B1 * | 4/2005 | Mueller | ......................... | 330/2 |
| 6,973,334 B2 * | 12/2005 | Katagishi et al. | ............ | 455/571 |
| 7,016,654 B1 * | 3/2006 | Bugeja | ........................ | 455/73 |
| 7,058,369 B1 * | 6/2006 | Wright et al. | ............. | 455/114.2 |
| 2001/0036815 A1 * | 11/2001 | Nakamura | .................... | 455/127 |
| 2002/0019218 A1 * | 2/2002 | Greverie et al. | ............ | 455/127 |
| 2004/0198465 A1 * | 10/2004 | Nation | ......................... | 455/573 |

* cited by examiner

*Primary Examiner*—Emmanuel Bayard
(74) *Attorney, Agent, or Firm*—Pearl Cohen Zedek Latzer LLP (57) ABSTRACT

In some embodiments of the present invention the nature of an input signal is identified and the amplification of a pre-amplifier and a power amplifier in a transmitter system are modified responsive to whether the momentary content of the input signal is a preamble or data and to the modulation rate of the input signal. In some other embodiments sets of amplification factors are set to reduce in-band noise at the antenna of the transmitter system.

25 Claims, 6 Drawing Sheets

POWER AMPLIFIER PRE-DISTORTION DEVICE AND METHOD FOR ORTHOGONAL FREQUENCY DIVISION MULTIPLEXING

BACKGROUND OF THE INVENTION

Power amplifiers working in a wide dynamic range or wide frequency span may produce a distorted amplified signal due to the non-linearity of their amplification attributes (also known as transfer function). This non-linearity may limit the output power of the power amplifier or distort the output signal, or both.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of embodiments of the invention. However it will be understood by those of ordinary skill in the art that embodiments of the present invention may be practiced without these specific details. In other instances, well-known methods, procedures, components and circuits have not been described in detail so as not to obscure the description of embodiments of the present invention.

It should be understood that embodiments of the present invention may be used in a variety of applications. Although the present invention is not limited in this respect, the circuit disclosed herein may be used in many apparatuses such as in the transmitters of a radio system. Radio systems intended to be included within the scope of the present invention include, by way of example only, cellular radiotelephone communication systems, two-way radio communication systems, one-way pagers, two-way pagers, personal communication systems (PCS), wireless portable computers (such as notebooks, lap tops, etc.), personal digital assistants (PDAs) and the like. The circuits and methods disclosed here may be used in the implementation of many communication standards such as IEEE 802.11a and 802.11g standards, European Technical Standards Institute (ETSI) project Broadband Radio Access Networks (BRAN), HyperLAN, Broadband TV and Radio, high power transmitters, wireless LAN, etc. Additionally, circuits and methods disclosed here may be used in combination PDA-cellphone, combination pocketPC-cellphone, and the like. It should also be understood that the term "transfer function", as it is used hereinafter, relates to linear and non-linear transfer functions, and to real, imaginary and complex transfer functions.

Figure 1:
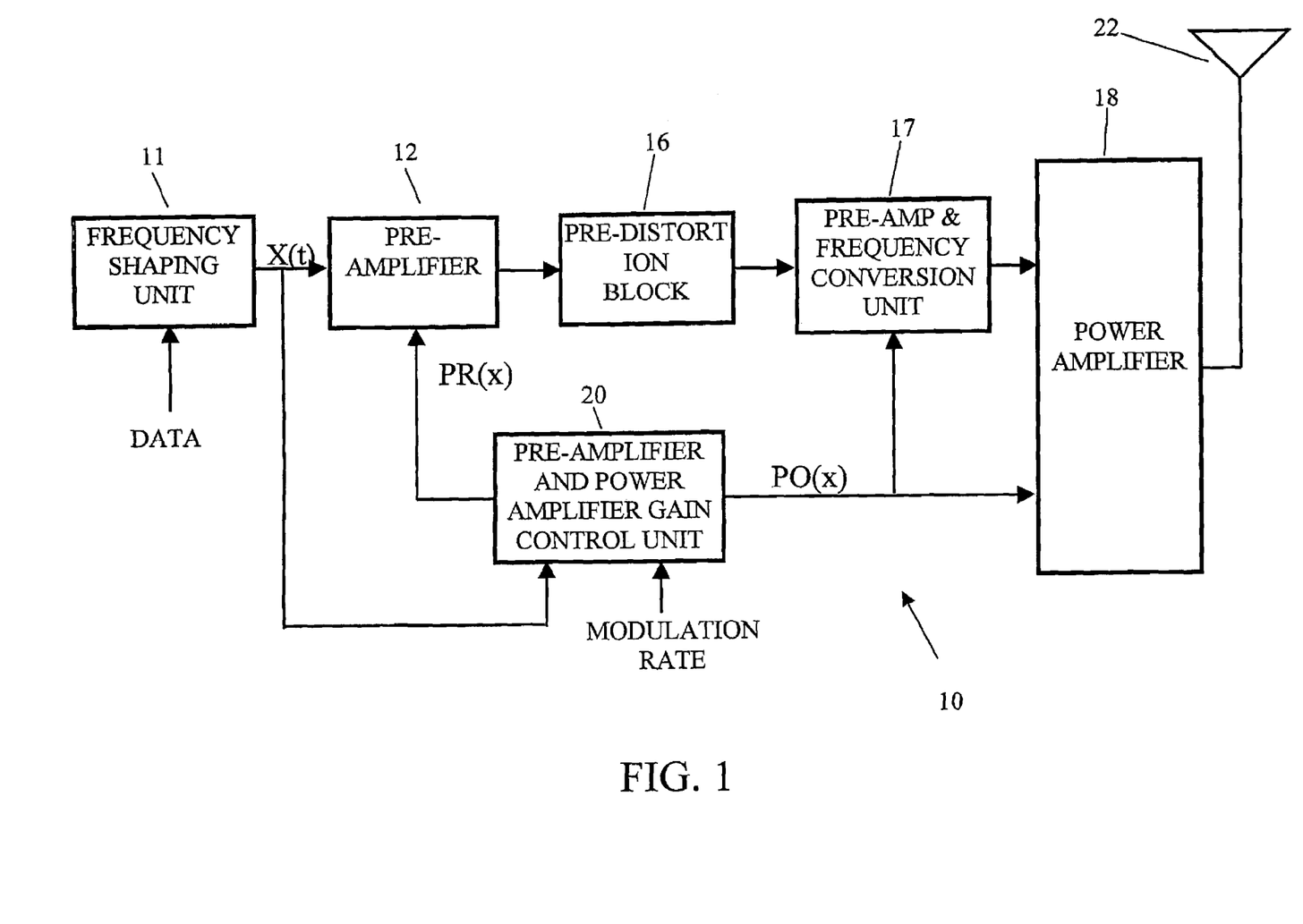
FIG. 1 is a schematic block diagram illustration of a transmitter having a distortion handling and frequency shaping system according to some embodiments of the present invention.
Figure 2:
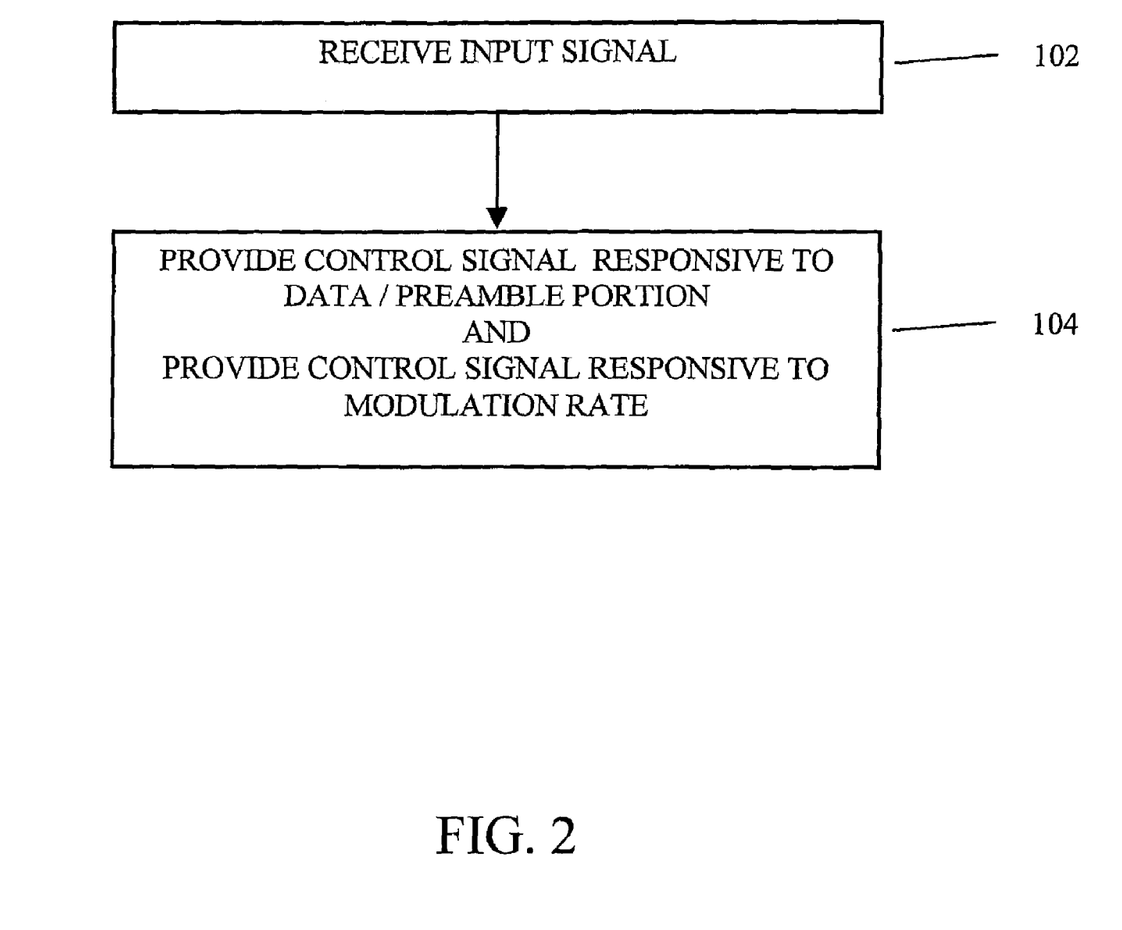
FIG. 2 is a schematic flow diagram illustration of a method for a distortion handling according to some embodiments of the present invention.

Reference is made now to FIGS. 1 and 2, which are a schematic block diagram illustration of a transmitter having a distortion handling and frequency shaping system 10 and a flowchart illustration of a method for distortion handling and frequency shaping system 10, respectively, according to some embodiments of the present invention. System 10 may comprise a frequency shaping unit 11, a pre-amplifier 12, a pre-distortion block 16, a pre-amplifier and frequency conversion unit 17, and a pre-amplifier and power amplifier gain control unit 20. The transmitter may also comprise a power amplifier 18 and an antenna 22.

Pre-amplifier and power amplifier gain control unit 20 may be implemented by any suitable control unit capable of performing calculations and outputting control signals, such as, but not limited to, a central processing unit (CPU). Power amplifier 18 may be implemented by any suitable controllable power amplifier, and may receive a digital control gain signal or an analog control signal. Antenna 22 may be of any desired kind such as, but not limited to, dipole, Yagi and multi-pole and the like.

Pre-amplifier 12 may be gain-controllable. Pre-amplifier 12 may be implemented by any suitable controllable amplifier such, but not limited to, a digital gain controllable amplifier, an analog gain controllable amplifier and the like.

A signal X(t) may represent any signal that contains at least one portion of preamble and one portion of data, and may have multiple possible modulation rates, such as an orthogonal frequency division multiplexing (OFDM) signal, or the like. Pre-amplifier and power amplifier gain control unit 20 may receive signal X(t) (-102-) and may produce a pre-amplifier gain control signal PR(x) and a power gain control signal PO(x) (-104-).

The gain of pre-amplifier 12 may be controlled by pre-amplifier gain control signal PR(x). Pre-amplifier gain control signal PR(x) is responsive to the nature of the momentary content of signal X(t) and may have two or more different values which may represent at least whether the momentary content of X(t) is preamble or data. In some embodiments of the present invention the gain of pre-amplifier 12 may be set, for example, to a high value for portions of X(t) containing preamble and to a lower value for portions of X(t) containing data. In signals containing preamble portions and data portions the dynamic range of the preamble portion is typically lower than the dynamic range of the data portion. Thus, setting the gain of pre-amplifier 12 to higher value for the preamble portion of X(t) and to a lower value for the data portion may enable enhancement of the average output power from power amplifier 18 with fewer or reduced over-amplification distortions.

The gain of pre-amplifier and frequency conversion unit 17 and power amplifier 18 may be controlled by power gain control signal PO(x). Power gain control signal PO(x) may be derived from the modulation rate of input signal X(t). The modulation rate of input signal X(t) may be received from outside of system 10 or may be derived and calculated by pre-amplifier and power amplifier gain control unit 20 from signal X(t). For example, PO(x) may be calculated from a chart of predefined values accessible by pre-amplifier and power amplifier gain control unit 20, where the predefined values may represent a desired gain as a function of modulation rate. For example, IEEE Standard 802.11(a) (OFDM signal) imposes specific requirements of the linearity for each of the 8 possible different modulation rates. In order to comply with such requirements, power gain control signal PO(x) may have the appropriate value for each modulation rate that ensures that the gain of system 10 will maintain the required linearity.

Power gain control signal PO(x) may also receive values according to other requirements, such as the change of working mode from "work" to "wait" or to "sleep".

In some embodiments of the present invention system 10 may be used to minimize the constellation error in a receiver receiving the signal transmitted from antenna 22. It is known that the constellation error may be lowered by lowering the in-band noise in each of the frequency bands of a signal such as an OFDM signal. Selection of desired amplification values for pre-amplifier and frequency conversion unit 17 and for power amplifier 18 so that the in-band noise of a signal transmitted by system 10 is reduced may reduce the constellation error as it may be measured, for example, at a receiver. Thus, the value of power gain control signal PO(x) may be selected so as to reduce the constellation errors by adapting appropriate gain values to different conditions and signal features.

Figure 3:
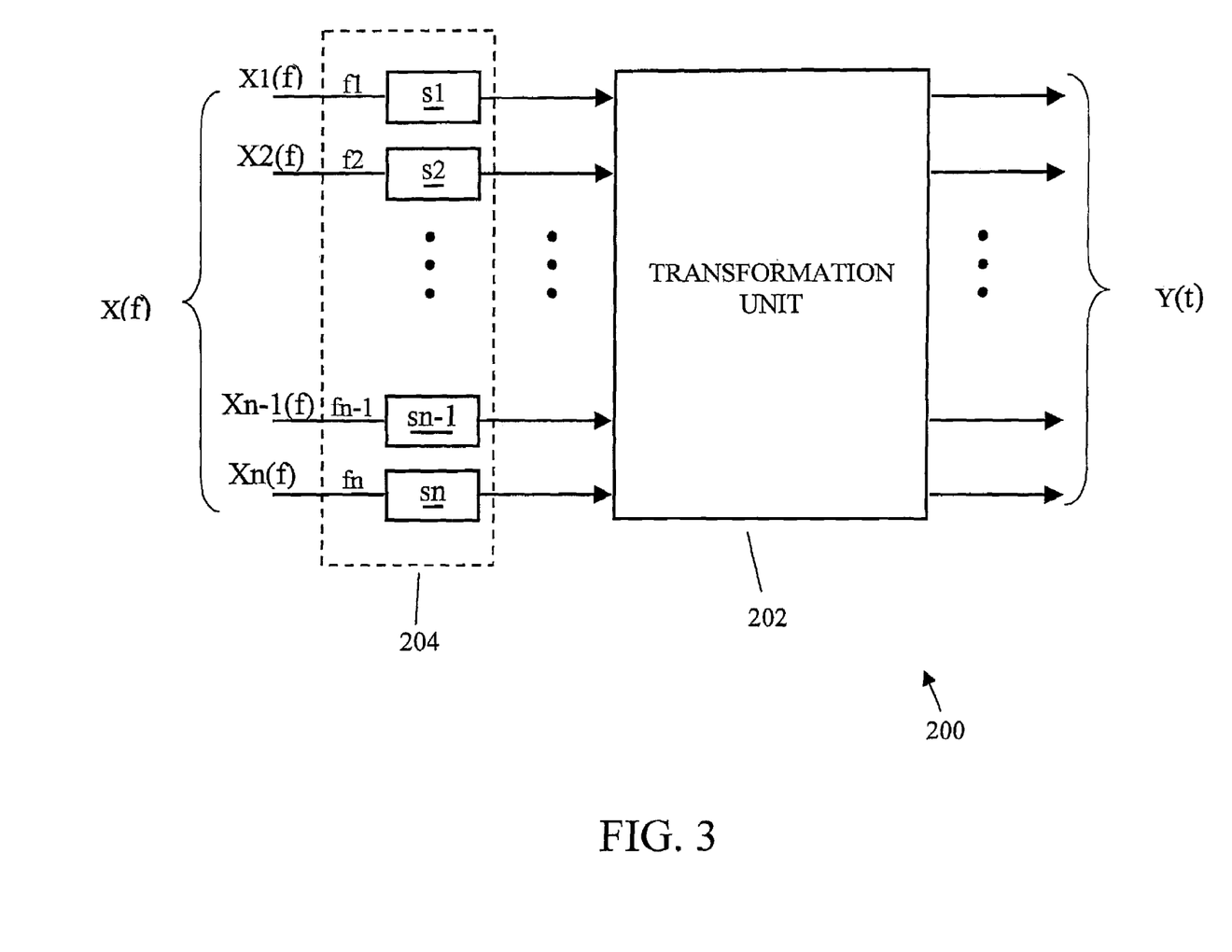
FIG. 3 is a schematic block diagram of a compensated transformation system according to some embodiments of the present invention.

Reference is made now to FIG. 3, which is a schematic block diagram of a compensated transformation system 200 according to some embodiments of the present invention. Compensated transformation system 200 may be part of frequency shaping unit 11 (FIG. 1) and may comprise a transformation unit 202 and a frequency shaping block 204. Transformation unit 202 may be any unit performing transformations such as Fourier Transformation (FT), Fast Fourier Transformation (FFT) or the like. Transformation unit 202 is capable of receiving a signal X(f) in the frequency domain. Signal X(f) may comprise a plurality of separate frequency bands denoted f1 . . . fn, each of which is a relatively narrow band. For example, if the received signal is an OFDM signal operating according to standard IEEE 802.11a, then the number of separate frequency bands may be equal to 52.

Transformation unit 202 may provide an output signal y(t) in the time domain. The transfer function of transformation unit 202 may be nonlinear and thus may distort its output signal. Shaping block 204, comprising a plurality of amplification units S1 . . . sn, having amplification factors a1 . . . an respectively, may be used. Amplification factors a1 . . . an may be controlled independently of one another. The values of amplification factors a1 . . . an may be selected so that the Error Vector Magnitude (EVM), defined by the ratio between the constellation error (at a receiving apparatus) and the desired transmitted signal, is minimized. The EVM may be minimized, for example, by selecting the values of amplification factors a1 . . . an so as to minimize the in-band noise. Each amplification factor ak, $a1 \leq ak \leq an$, may be of any desired value, including real values, imaginary values and complex values. The values of amplification factors a1 . . . an may be calculated by any suitable processing unit, or be taken from a table that may be stored in any suitable storage device. Amplification factors a1 . . . an may also be re-calculated and reset to compensate for variances over time. It should also be understood that the values of amplification factors a1 . . . an, may be chosen according to many other possible schemes, so as to reduce the in-band noise of the signal transmitted at antenna 22.

Figure 4:
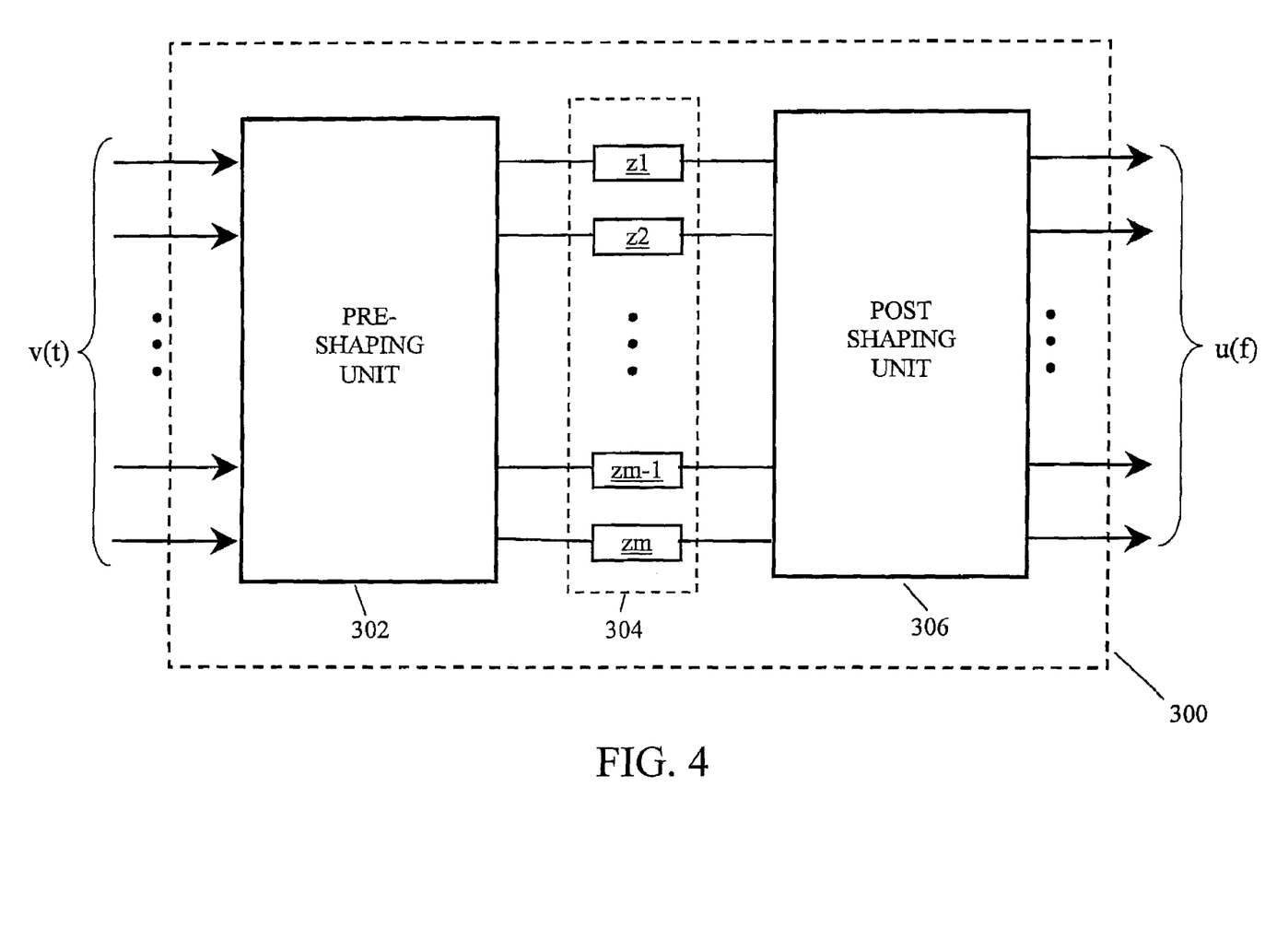
FIG. 4 is a schematic block diagram of a linearity control section according to some embodiments of the present invention.
Figure 5:
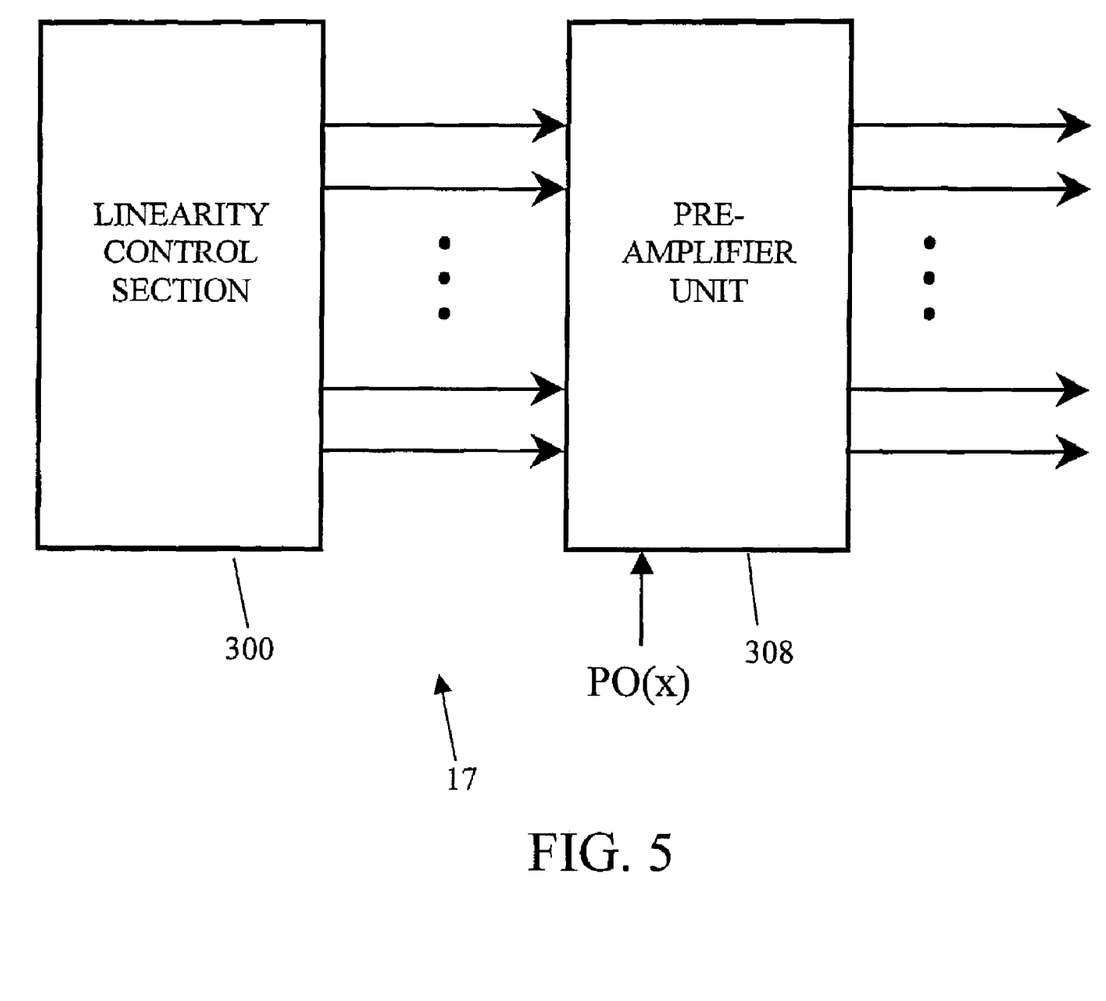
FIG. 5 is a schematic block diagram of pre-amplifier and frequency conversion unit according to some embodiments of the present invention.

Reference is made now to FIG. 4, which is a schematic block diagram of a linearity control section 300 and to FIG. 5, which is a schematic block diagram of pre-amplifier and frequency conversion unit 17 according to some embodiments of the present invention. Linearity control section 300 may be part of pre-amplifier and frequency conversion 17 and may comprise a pre-shaping unit 302, a frequency-shaping block 304 and a post-shaping unit 306. According to some embodiments of the present invention pre-shaping unit 302 may be a Fast Fourier Transformation (FFT) unit and post-shaping unit 306 may be an Inverse Fast Fourier Transformation (IFFT) unit.

Pre-shaping unit 302 may receive an input signal v(t) in the time domain and transform it into a signal u(f) in the frequency domain. Signal u(f) may comprise up to m separate frequency bands denoted f1 . . . fm, each of which is a relatively narrow band. Shaping block 304 may comprise up to m separate amplification units z1 . . . zm corresponding to frequency bands f1 . . . fm, with amplification factors b1 . . . bm respectively. Signal v(t) may be received from pre-distortion block 16 (FIG. 1).

If the transfer function of linearity control section 300, of pre-shaping unit 302 and of post-shaping unit 306 is $J_1$, the values of amplification factors b1 . . . bm may be set to form a transfer function B substantially equal to $J_1^{-1}$. Thus, the over all transfer function $J_{TOTAL}$ of pre-amplifier unit 308 and linearity control section 300 may be substantially equal to the unity transfer function:

$$J_{TOTAL} = J_1 \times B \cong 1 \qquad (1)$$

thus linearity control section 300 may be designed to compensate for linear distortions of pre-amplifier 308, so as to not interfere with the distortions handling of power amplifier 18 performed by pre-distortion block 16. Each amplification factor bk, $b1 \leq bk \leq bm$, may be of any desired value, including real values, imaginary values and complex values. The values of amplification factors b1 . . . bm may be calculated by any suitable processing unit, or be taken from a table that may be stored in any suitable storage device. Amplification factors b1 . . . bm may also be re-calculated and reset to compensate for variances in transfer function $J_1$ over time.

Figure 6:
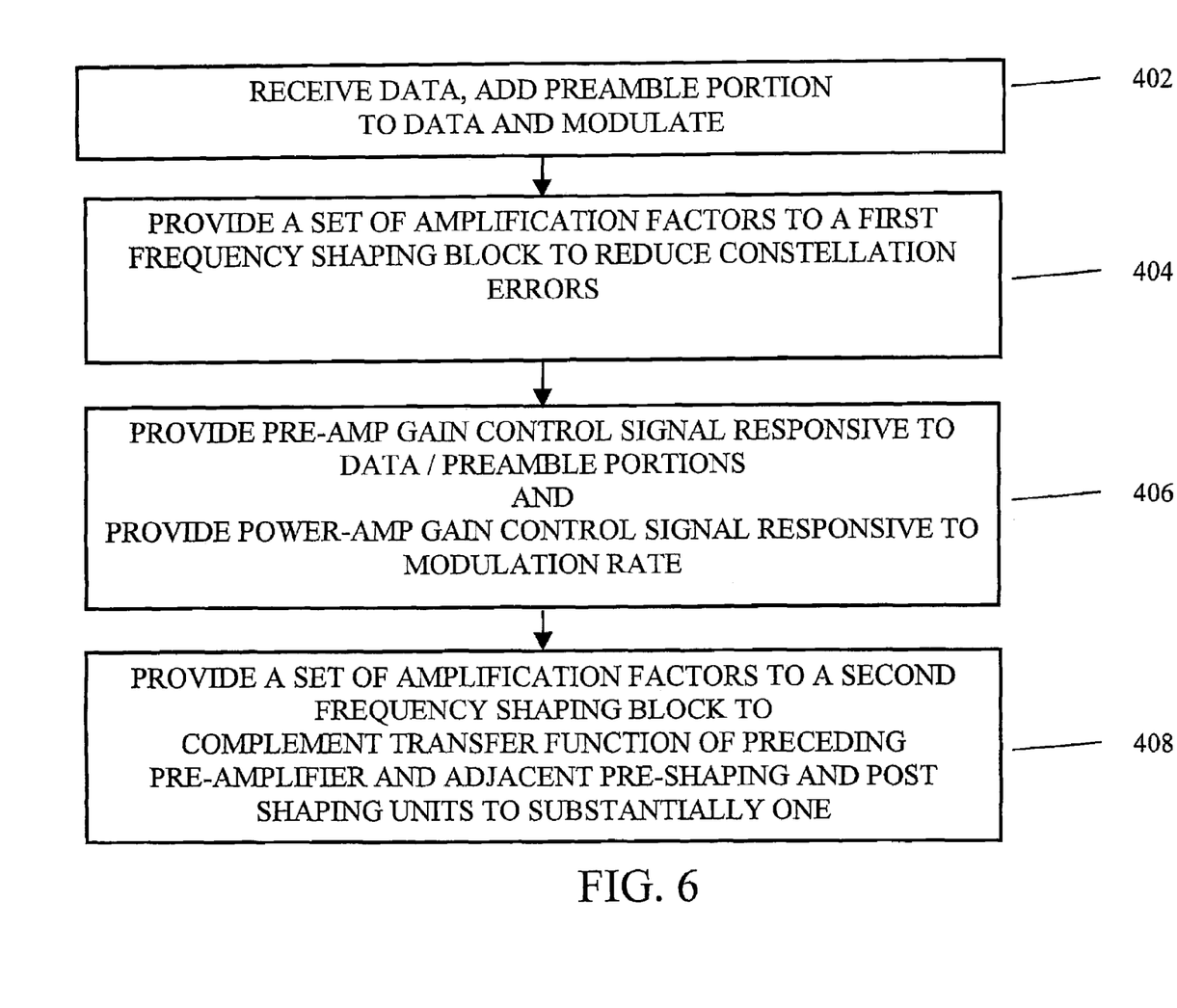
FIG. 6 is a schematic flow diagram illustration of a method for a distortion and in-band noise handling according to some embodiments of the present invention.

Reference is made now to FIG. 6, which is a schematic flow diagram illustration of a method for distortion and in-band noise control according to some embodiments of the present invention. Input data may be modified with a preamble portion and modulated in frequency shaping unit 11 (FIG. 1) (-402-) to form a signal X(t). A first set of amplification gain factors may be provided to a frequency shaping block 204 (FIG. 3), one for each frequency band, to reduce the EVM at antenna 22 (FIG. 1) (-404-). Pre-amplifier gain control signal PR(x) may be provided to pre-amplifier 12 (FIG. 1) responsive to whether the momentary content of signal X(t) is preamble or data (-406-). Power gain control signal PO(x) may be provided to power amplifier 18 (FIG. 1) responsive to the modulation rate of signal X(t); a second set of amplification gain factors may be provided to frequency shaping block 304 (FIG. 4), one for each frequency band of signal u(f), to shape a transfer function which complements the transfer function of pre-amplifier unit 308, of pre-shaping unit 302 and of post-shaping unit 306 (FIG. 4) substantially to a unity transfer function (-408-).

It would be apparent to a person skilled in the art that the system and method for reducing EVM and in-band noise described above are just examples. The same inventive solution may be used in many other ways, as long as pre-amplifier gain and power amplifier gain are responsive to the nature of an input signal (whether it is a preamble or data portion and its modulation rate). In other embodiments of the present invention the same inventive solution may be used in many other ways, as long as set(s) of amplification factors are utilized to set amplification so as to minimize the in-band noise or to complement a transfer function of certain portions of a system to substantially a unity transfer function.

While certain features of the present invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
providing separate amplification values to separate amplification units of a frequency shaping block so that a transfer function of a linearity control section including at least said frequency shaping block and a pre-amplifier unit is substantially equivalent to a unity transfer function, wherein said separate amplification units correspond to different frequency bands of a multi-frequency signal.

2. The method of claim 1 further comprising providing an orthogonal frequency division multiplexing (OFDM) signal as said multi-frequency signal.

3. The method of claim 1 wherein at least one of said separate amplification values is a complex number.

4. A method comprising,
providing separate amplification values to internal amplification units of a first amplifier, wherein said internal amplification units correspond to frequency bands of a multi-frequency signal provided to said first amplifier;
providing an output signal of said first amplifier to a second amplifier; and
setting said separate amplification values so as to reduce in-band noise of an output signal of said second amplifier.

5. The method of claim 4, further comprising providing an orthogonal frequency division multiplexing (OFDM) signal as said multi-frequency signal.

6. The method of claim 4, further comprising providing a complex value as at least one of said separate amplification values.

7. An article comprising a storage medium having stored thereon instructions that, when executed by a computing unit, result in:
providing a multi-frequency signal to a first amplifier;
providing separate amplification values to separate frequency bands of said multi-frequency signal;
providing an output signal of said first amplifier to a second amplifier; and setting said separate amplification values so as to reduce in-band noise at an output of said second amplifier.

8. The article of claim 7 wherein said instructions further result in:
determining an amplification value for said first amplifier based on whether a momentary content of said multi-frequency signal is preamble or data, and determining an amplification value for said second amplifier based on a modulation rate of said multi-frequency signal.

9. The article of claim 7 wherein said instructions further result in:
providing an orthogonal frequency division multiplexing (OFDM) signal as said input signal.

10. An article comprising a storage medium having stored thereon instructions that, when executed by a computing unit, result in:
providing a multi-frequency signal to a first amplifier;
providing separate amplification values to separate frequency bands of said multi-frequency signal;
providing an output signal of said first amplifier to a second amplifier, setting said separate amplification values so as to make a combined transfer function of said fast amplifier and said second amplifier substantially equal to a unity transfer function.

11. The article of claim 10, wherein said instructions further result in:
providing an orthogonal frequency division multiplexing (OFDM) signal as said multi-frequency signal.

12. The article of claim 10, wherein said instructions further result in:
providing at least one of said separate amplification values a complex number.

13. An apparatus comprising:
a first amplifier having an input terminal;
a second amplifier having an output terminal; and
a frequency shaping unit coupled to said first amplifier and to said second amplifier having two or more amplification units, said amplification units corresponding to different frequency bands of a multi-frequency input signal, to set the gain value of said amplification units to reduce in-band noise at said output terminal of a multi-frequency signal provided at said input terminal.

14. The apparatus of claim 13, wherein said multi-frequency signal is an orthogonal frequency division multiplexing (OFDM) signal.

15. The apparatus of claim 13, wherein at least one of said gain values is a complex number.

16. An apparatus comprising:
a first amplifier having an input terminal;
a second amplifier having an output terminal,
a frequency shaping unit coupled to said first amplifier and to said second amplifier, having two or more amplification units, said amplification units corresponding to different frequency bands of a multi-frequency input signal, to set the gain value of said first amplifier, of second amplifier and of said frequency shaping unit substantially equal to a unity transfer function.

17. The apparatus of claim 16, wherein said multi-frequency signal is an orthogonal frequency division multiplexing (OFDM) signal.

18. The apparatus of claim 16, wherein at least one of said gain values is a complex number.

19. A system comprising:
a first amplifier having an input terminal;
a second amplifier, having an output terminal, coupled to said first amplifier, a gain control unit, responsive to an input signal present at said input terminal, coupled to said first amplifier and to said second amplifier, to provide a first gain control signal to said first amplifier responsive to whether the momentary content of said input signal contains a data portion or a preamble portion, and a second control signal to said second amplifier responsive to modulation rate of said input signal; and a dipole antenna coupled to said output terminal of said second amplifier.

20. The system of claim 19, wherein said input signal is an orthogonal frequency division multiplexing (OFDM) signal.

21. The system of claim 20, wherein said first and said second control signals are set to reduce in-band noises in the frequency bands of said orthogonal frequency division multiplexing (OFDM) signal.

22. A system, comprising:

a first frequency shaping unit, adapted for receiving a multi-frequency input signal, wherein said first frequency shaping unit comprises a plurality of controllable amplification units, one for each frequency band of said multi-frequency input signal;

a first amplifier coupled to said first frequency shaping unit;

a second frequency shaping unit, coupled to said first amplifier comprising a plurality of separately controllable amplification units, one for each frequency band of said multi-frequency input signal;

a second amplifier, coupled to said second frequency shaping unit;

a third amplifier coupled to said second amplifier;

a dipole antenna coupled to said third amplifier for transmitting a multi-frequency output signal; and a gain control unit, for providing a first gain value to said first frequency shaping unit, a second gain value to said second frequency shaping unit, a third gain value to said first amplifier, and a fourth gain value to said third amplifier responsive to said multi-frequency output signal, each for reducing in-band noises thereof.

23. The system of claim 22, wherein said multi-frequency input signal is an orthogonal frequency division multiplexing (OFDM) signal.

24. The system of claim 22, wherein said gain values are responsive to a modulation rate of said input signal.

25. The system of claim 22, wherein at least one of said gain values is a complex number.

* * * * *